United States Patent
Topoulos

(10) Patent No.: US 8,476,354 B2
(45) Date of Patent: Jul. 2, 2013

(54) LOW SINK MARKS AND EXCELLENT SURFACE APPEARANCE REINFORCED POLYAMIDE COMPOSITIONS

(75) Inventor: Georgios Topoulos, Meyrin (CH)

(73) Assignee: E I du Pont de Nemours and Company, Wilmington, DE (US)

( * ) Notice: Subject to any disclaimer, the term of this patent is extended or adjusted under 35 U.S.C. 154(b) by 849 days.

(21) Appl. No.: 12/640,086

(22) Filed: Dec. 17, 2009

(65) Prior Publication Data

US 2010/0160008 A1   Jun. 24, 2010

Related U.S. Application Data

(60) Provisional application No. 61/203,572, filed on Dec. 23, 2008.

(51) Int. Cl.
*C08K 7/14*   (2006.01)
*C08L 77/00*   (2006.01)

(52) U.S. Cl.
USPC ........... 524/494; 428/220; 428/504; 524/538; 525/432

(58) Field of Classification Search
USPC ................... 525/432, 494, 538; 428/220, 504
See application file for complete search history.

(56) References Cited

U.S. PATENT DOCUMENTS

2008/0167415 A1   7/2008   Stoeppelmann et al.

FOREIGN PATENT DOCUMENTS

| EP | 1 413 604 | | 2/2007 |
| WO | 02/31053 | | 4/2002 |
| WO | WO 02/31053 | * | 4/2002 |
| WO | 2008/070157 | | 6/2008 |

OTHER PUBLICATIONS

Japan Abstract, 2008-202693, NSK Ltd.
International Search Report, PCT/US2009/069142, Filing Date Dec. 22, 2009.

* cited by examiner

*Primary Examiner* — Ana Woodward

(57) ABSTRACT

The invention relates to resin compositions comprising a) at least one amorphous semi-aromatic polyamide; b) at least two semi-crystalline polyamides, b1) and b2) and c) at least one glass reinforcement agent and shaped articles thereof showing a good balance of properties in terms of good mechanical properties, excellent surface appearance and reduced sink marks.

8 Claims, No Drawings

LOW SINK MARKS AND EXCELLENT SURFACE APPEARANCE REINFORCED POLYAMIDE COMPOSITIONS

CROSS-REFERENCE TO RELATED APPLICATIONS

This application claims the benefit of U.S. Provisional Application No. 61/203,572, filed Dec. 23, 2008, which is incorporated herein by reference in its entirety.

FIELD OF THE INVENTION

The present invention relates to the field of reinforced polyamide compositions, particularly it relates to reinforced polyamide compositions for manufacturing articles having low sink marks and an excellent surface appearance.

BACKGROUND OF THE INVENTION

Thermoplastic polyamide compositions are desirable for use in a wide range of applications including parts used in automobiles, electrical/electronic parts, household appliances and furniture because of their good mechanical properties, heat resistance, impact resistance and chemical resistance and because they may be conveniently and flexibly molded into a variety of articles of varying degrees of complexity and intricacy.

As an example, thermoplastic polyamide compositions are particularly suited for making housings for hand held electronic devices, such as mobile telephones, personal digital assistants, laptop computers, tablet computers, global positioning system receivers, portable games, radios, cameras and camera accessories. Such applications are highly demanding applications since they require polyamide compositions that exhibit a good balance of mechanical properties and aesthetical aspect (e.g. surface appearance and low sink marks) while not interfering with the intended operability of the hand held electronic device, e.g. through absorption of electromagnetic waves.

In an attempt to improve mechanical properties, it has been the conventional practice to add various reinforcements to the resin, like for example glass fibers, glass flakes, carbon fiber, mica, wollastonite, talc, calcium carbonate so as to obtained reinforced polyamide compositions. Glass fibers are known to offer excellent dispersion in thermoplastic polymers and lead to good mechanical properties under standard conditions. Moreover, it is important that the housings of such devices made from polyamide compositions be able to withstand the rigors of frequent use. It is often desirable that such compositions have good stiffness and impact resistance and that they exhibit excellent surface appearance.

Semi-crystalline nylons such us polyamide 66 are known to provide excellent mechanical properties. Nevertheless, articles molded from polyamide 66, for example, exhibit significant changes in mechanical properties upon moisture absorption and therefore are not suitable for such applications. Moreover, semi-crystalline polymers exhibit shrinkage during crystallization in the mold. This may lead to surface defects known as sink marks in certain areas of molded components. Typically sink marks appear in the area of locally higher thickness which often is on the opposite side of reinforcing ribs. Sink marks are depressions or dimple indentations on the surface of injection molded plastic parts thus leading to a poor surface quality of the molded part. Sink marks are imperfections that appear as dimples, craters or ripples. Such defects are undesirable and not acceptable because of an accompanying reduction of the aesthetic surface appearance and because sink marks remain visible after painting the article. In an attempt to reduce sink marks on molded parts, there have been proposed to use or add amorphous polyamides. Nevertheless, amorphous nylons have usually lower mechanical properties, for instance they are more brittle. Melt blending amorphous polyamides with comparable or lower amount of semi-crystalline polymers is a known way to improve mechanical properties. However such blends do not simultaneously yield satisfactory mechanical properties and surface appearance because they result either in poor surface appearance or in articles having too high sink marks.

US 2008/0167415 discloses reinforced polyamide molding materials comprising an aliphatic partly crystalline polyamide and flat glass fibers with elongated shape. Disclosed examples comprise 50 wt-% of a blend of an amorphous polyamide (PA 6I/6T) and an aliphatic partly crystalline polyamide (PA66) and 50 wt-% of flat glass fibers. Whereas this composition exhibits good mechanical properties and a good surface appearance in terms of gloss, this composition exhibits deep sink marks.

Unfortunately, existing technologies fail to combine good mechanical properties and a high quality aesthetical aspect in terms of surface appearance and low sink marks.

A need remains for reinforced polyamide compositions that have a good balance of properties in terms of surface appearance, low sink mark formation and good mechanical properties.

SUMMARY OF THE INVENTION

It has been surprisingly found that a resin composition comprising a) at least one amorphous semi-aromatic polyamide; b) at least two semi-crystalline polyamides, b1) and b2); and c) at least one glass reinforcement agent exhibits a good balance of properties in terms of surface appearance, low sink mark formation and good mechanical properties.

In a second aspect, the invention provides a method for making an article comprising a step of shaping the resin composition of the invention.

In a third aspect, the invention provides a shaped article made of the resin composition of the invention.

DETAILED DESCRIPTION

As used throughout the specification, the phrases "about" and "at or about" are intended to mean that the amount or value in question may be the value designated or some other value about the same. The phrase is intended to convey that similar values promote equivalent results or effects according to the invention.

Polyamides are condensation products of one or more dicarboxylic acids and one or more diamines, and/or one or more aminocarboxylic acids.

The resin composition according to the present invention preferably comprises from at or about 20 to at or about 50 wt-% of at least one amorphous semi-aromatic polyamide, more preferably from at or about 20 to at or about 40 wt-% and still more preferably from at or about 25 to at or about 35 wt-%, the weight percentage being based on the total weight of the resin composition.

Amorphous polyamides do not possess a distinct melting point and the glass transition temperature (Tg) lies between 110 and 180° C.

Semi-aromatic polyamides are homopolymers, copolymers, terpolymers, or higher polymers that are derived from monomers containing aromatic groups.

Amorphous semi-aromatic polyamides may advantageously include monomeric units (i) selected from 1,3-diaminopropane, 1,4-diaminobutane, 1,5-diaminopentane, 2-ethyldiaminobutane, hexamethylenediamine, 2-methylpentamethylenediamine (MPMD), 2,2,4-trimethylhexamethylenediamine (TMD), 2,4,4-trimethylhexamethylenediamine (IND), bis(4-aminocyclohexyl)methane, 2,2-bis(4-aminocyclohexyl)isopropylidine, 1,4-diaminocyclohexane, 1,3-diaminocyclohexane, 1,4-diaminomethylcyclohexane, 3,3'-dimethyl-4,4'-diamino-dicyclohexylmethane (MACM), 3-aminomethyl-3,5,5-trimethylcyclohexylamine (IPD), bis(4-aminocyclohexyl) methane (PACM), 2,2-bis(p-aminocyclohexyl) propane (PACP), 1,6-diamino-2,2,4-trimethylhexane (ND) and mixtures thereof, in combination with monomeric units (ii) selected from aromatic carboxylic acids that can be terephthalic acid (T) or mixtures of terephthalic acid (T) and one or more other carboxylic acids, like isophthalic acid (I), phthalic acid, 2-methylterephthalic acid and naphthalenedicarboxylic. The amorphous polyamides may also contain as comonomers amounts of lactam species.

Preferably, the monomeric units (i) are selected from hexamethylenediamine; PACM; TMD; MACM and mixtures thereof, in combination with monomeric units (ii) selected from terephthalic acid (T) or mixtures of terephthalic acid (T) and isophthalic acid (I).

Still more preferably, the monomeric units (i) are selected from hexamethylenediamine; PACM and mixtures thereof in combination with monomeric units (ii) selected from mixtures of terephthalic acid (T) and isophthalic acid (I).

Mixtures of terephthalic acid and isophthalic acid preferably comprise from at or about 2 to at or about 60 wt-% of terephthalic acid (T) and from at or about 40 to at or about 98 wt-% of and isophthalic acid (I), more preferably comprise from at or about 10 to at or about 40 wt-% of terephthalic acid and from at or about 60 to at or about 90 wt-% of and isophthalic acid, the weight percentage being based on the sum of terephthalic acid and isophthalic acid.

The following list exemplifies the abbreviations used to identify monomers and repeat units in the semi-aromatic copolyamides (PA):

| | |
|---|---|
| HMD | hexamethylene diamine (or 6 when used in combination with a diacid) |
| AA | Adipic acid |
| I | Isophthalic acid |
| T | terephthalic acid |
| DMD | Decamethylenediamine |
| DDMD | Dodecamethylenediamine |
| DDA | Decanedioic acid |
| DDDA | Dodecanedioic acid |
| TDDA | Tetradecanedioic acid |
| MXD | meta-xylylene diamine |
| MPMD | 2-methylpentamethylenediamine |
| TMD | 2,2,4-trimethylhexamethylenediamine |
| IND | 2,4,4-trimethylhexamethylenediamine |
| MACM | 3,3'-dimethyl-4,4'-diamino-dicyclohexylmethane |
| IPD | 3-aminomethyl-3,5,5-trimethylcyclohexylamine |
| PACM | bis(4-aminocyclohexyl)methane |
| PACP | 2,2-bis(p-aminocyclohexyl) propane |
| ND | 1,6-diamino-2,2,4-trimethylhexane |
| 6 | polymer repeat unit formed from ∈-caprolactam |
| 66 | polymer repeat unit formed from HMD and AA |
| 610 | polymer repeat unit formed from HMD and DDA |
| 612 | polymer repeat unit formed from HMD and DDDA |
| 1010 | polymer repeat unit formed from DMD and DDA |
| 1012 | polymer repeat unit formed from DMD and DDDA |
| 6I | polymer repeat unit formed from HMD and I |
| 6T | polymer repeat unit formed from HMD and T |
| IPDI | polymer repeat unit formed from IPD and I |
| IPDT | polymer repeat unit formed from IPD and T |
| PACMI | polymer repeat unit formed from PACM and I |
| PACMT | polymer repeat unit formed from HMD and T |
| TMDT | polymer repeat unit formed from TMD and T |
| 6 | polymer repeat unit formed from €-caprolactam |
| 11 | polymer repeat unit formed from 11-aminoundecanoic acid |
| 12 | polymer repeat unit formed from 12-aminododecanoic acid |

Note that in the art the term "6" when used alone designates a polymer repeat unit formed from € -caprolactam. Alternatively "6" when used in combination with a diacid such as T, for instance 6T, the "6" refers to HMD. In repeat units comprising a diamine and diacid, the diamine is designated first. Furthermore, when "6" is used in combination with a diamine, for instance 66, the first "6" refers to the diamine HMD, and the second "6" refers to adipic acid. Likewise, repeat units derived from other amino acids or lactams are designated as single numbers designating the number of carbon atoms.

Preferably, the at least one amorphous semi-aromatic polyamide comprised in the resin composition according to the present invention include PA 6I/6T; PA 6I/6T/PACMI/PACMT; PA 6I/MACMI/MACMT, PA 6I/6T/MACMI, PA 12/MACMT, PA TMDT, PA 6I/6T/IPDI/IPDT, PA 6/TMDT/6T.

More preferably, the at least one amorphous semi-aromatic polyamide is PA 6I/6T; PA 6I/6T/PACMI/PACMT or mixtures thereof and still more preferably the at least one amorphous semi-aromatic polyamides is PA 6I/6T (hexamethylene isophthalamide/hexamethylene terephthalamide).

The resin composition according to the present invention preferably comprises from at or about 10 to at or about 40 wt-% of at least two semi-crystalline polyamides, b1) and b2), more preferably from at or about 10 to at or about 30 wt-% and still more preferably from at or about 14 to at or about 26 wt-%, the weight percentage being based on the total weight of to the resin composition.

Semi-crystalline polyamides can be produced by condensation of an aliphatic dicarboxylic acid with an aliphatic diamine containing from 4 to 12 carbon atoms. Carboxylic acid monomers comprised in the semi-crystalline polyamides include, but are not limited to aliphatic carboxylic acids, such as for example adipic acid (C6), pimelic acid (C7), suberic acid (C8), azelaic acid (C9), sebacic acid (C10) and dodecanedioic acid (C12). Diamines can be chosen among diamines having four or more carbon atoms, including, but not limited to tetramethylene diamine, hexamethylene diamine, octamethylene diamine, decamethylene diamine, 2-methylpentamethylene diamine, 2-ethyltetramethylene diamine, 2-methyloctamethylenediamine; trimethylhexamethylenediamine and/or mixtures thereof. The semi-crystalline polyamides may also contain as comonomers amounts, e.g. from at or about 1 to at or about 25 mole-% of terephthalic acid.

Suitable examples of semi-crystalline polyamides include PA6,6 (poly(hexamethylene adipamide)); PA6,10 (poly(hexamethylene sebacamide)); PA6,12 poly(hexamethylene dodecanoamide); PA10,10 (poly(decamethylene sebacamide)) and copolymers and blends of the same.

Preferably, one of the at least two semi-crystalline polyamides b1) is fully miscible with the amorphous semi-aromatic polyamide b1) and one of the at least two semi-crystalline polyamides b2) is partially miscible with the amorphous semi-aromatic polyamide. The at least two semi-crystalline polyamides comprise at least a first semi-crystalline polyamide b1) and a second semi-crystalline polyamide b2). Preferably, one of the at least two semi-crystalline polyamides is b1) PA66. And preferably, the second of the at least two semi-crystalline polyamides is b2) PA1010, PA612, PA610 or mixtures thereof.

Preferably, b1) is present in an amount from at or about 5 wt-% to at or about 20 wt-%; and b2) is present in an amount from at or about 5 to at or about 20 wt-%, provided that the sum of components b1)+b2) is between at or about 10 to at or about 40 wt-%, the weight percentages being based on the total weight of the resin composition, i.e. the sum of components a), b) and c) in accordance with the invention.

With the aim of increasing the strength of the resin composition, at least one glass reinforcement agent is added to the composition. Preferably, the resin composition according to the present invention comprises from at or about 10 to at or about 70 wt-% of the at least one glass reinforcement agent, more preferably from at or about 25 to at or about 65 wt-% and still more preferably from at or about 35 to at or about 55 wt-%, the weight percentages being based on the total weight of the resin composition.

Preferably, the at least one glass reinforcement agent is non-circular cross-sectional fibrous glass filler such as those described in EP 0190011 and in EP 196194. These fibrous glass fillers are characterized by a non-circular cross section. The non-circular cross section have the shape of, for example, an oval, elliptic, cocoon or rectangular.

These kinds of non-circular cross-sectional fibrous glass filler are described and differentiated from conventional fibrous glass fillers by their cross-sectional aspect ratio and are differentiated from conventional glass flakes by their fibrous nature. The term "fibrous" in the context of the invention means composed of one or multiple filaments of glass. The "cross-sectional aspect ratio" is measured by cutting the fibrous glass filler perpendicularly to its longitudinal axis and measuring the ratio between the major axis of the cross section (i.e. its longest linear dimension) and the minor axis of the cross section (i.e. its shortest linear dimension perpendicular to the major axis). For comparison, circular cross-section fibers that are typically employed have a cross-sectional aspect ratio of about 1. Glass flakes fillers are differentiated from non-circular cross-sectional glass filler by their non-fibrous nature. While not wishing to be bound by theory, it is believed that the use of fibrous non-circular cross-sectional glass filler enables an increase in bond strength between the filler and the polymer material. Due to their specific surface areas which is greater than those of conventional fibrous circular cross-sectional glass fillers, such fibrous non-circular cross-sectional glass fillers produce under standard conditions an improved reinforcing effect with significant improvement in a) impact resistance, b) warpage stability and c) fluidity during injection molding compared to conventional fibrous glass fillers having a circular cross-sectional shape. The use of fibrous glass filler having a non-circular cross-sectional shape is described in WO 2008/070157 in polyamide compositions. Examples of fibrous glass fillers having a cross-sectional aspect ratio of greater than at or about 4 are rectangular or flat-shaped ones. Preferred glass reinforcing agents used in the resin composition of the present invention are fibrous glass fillers having a non-circular cross-sectional aspect ratio of greater than at or about 4.

A partial amount of the fibrous non-circular cross-sectional glass fillers can be replaced by others reinforcing agents such as fibrous reinforcing agents having a circular cross section or glass flakes or particulate reinforcing agents. Preferably, from about 1 wt-% of the fibrous non-circular cross-sectional glass fillers to about 50 wt-% can be replaced by the others reinforcing agents, The resin composition according to the present invention may further comprise one or more heat stabilizers. The one or more heat stabilizers may be selected from copper salts and/or derivatives thereof such as for example copper halides or copper acetates; divalent manganese salts and/or derivatives thereof and mixtures thereof. Preferably, copper salts are used in combination with halide compounds and/or phosphorus compounds and more preferably copper salts are used in combination with iodide or bromide compounds, and still more preferably, with potassium iodide or potassium bromide. When present, the one or more heat stabilizers are present in an amount from at or about 0.1 to at or about 3 wt-%, or preferably from at or about 0.1 to at or about 1 wt-%, or more preferably from at or about 0.1 to at or about 0.7 wt-%, the weight percentage being based on the total weight of the resin composition.

The resin composition according to the present invention may further comprise one or more antioxidants such as phosphate or phosphonite stabilizers, hindered phenol stabilizers, hindered amine stabilizers, aromatic amine stabilizers, thioesters, and phenolic based anti-oxidants. When present, the one or more antioxidants comprise from at or about 0.1 to at or about 3 wt-%, or preferably from at or about 0.1 to at or about 1 wt-%, or more preferably from at or about 0.1 to at or about 0.7 wt-%, the weight percentage being based on the total weight of the resin composition.

The resin composition according to the present invention may further comprise one or more impact modifiers. Preferred impact modifiers include those typically used for polyamide compositions, including ionomers, carboxyl-functionalized polyolefins, and/or mixtures thereof.

Ionomers are thermoplastic resins that contain metal ions in addition to the organic backbone of the polymer. Ionomers are ionic copolymers formed from an olefin such as ethylene and $\alpha,\beta$-unsaturated $C_3$-$C_8$ carboxylic acid, such as for example acrylic acid (AA), methacrylic acid (MAA) or maleic acid monoethylester (MAME), wherein at least some of the carboxylic acid moieties in the copolymer are neutralized to form the corresponding carboxylate salts. Preferably, about 5 to about 99.9% of the acid moieties of the acid copolymer are nominally neutralized by neutralizing agents chosen among alkali metals like lithium, sodium or potassium; transition metals like manganese or zinc and mixtures thereof. Ionomers may optionally comprise softening comonomers selected from alkyl acrylate and alkyl methacrylate wherein the alkyl groups have from one to eight carbon atoms. Overall, ionomers can be described as E/X/Y copolymers where E is an olefin such as ethylene, X is a $\alpha,\beta$-unsaturated $C_3$-$C_8$ carboxylic acid, and Y is a softening comonomer, wherein X is from at or about 2 wt-% to at or about 30 wt-% of the E/X/Y copolymer and Y can be present in an amount of from about 0 to about 40 wt-% of the E/X/Y copolymer, wherein the carboxylic acid functionalities are at least partially neutralized. Suitable ionomers for use in the present invention are commercially available under the trademark Surlyn® from E.I. du Pont de Nemours and Company, Wilmington, Del.

Carboxyl-functionalized polyolefins are polyolefins that have carboxylic moieties attached thereto, either on the polyolefin backbone itself or on side chains. By "carboxyl-functionalized polyolefin" is meant that the polymer, which can be a homopolymer, a copolymer or a terpolymer, is grafted and/ or copolymerized with carboxylic moieties. By "carboxylic moieties" is meant carboxylic groups such as one or more of dicarboxylic acids, diesters, dicarboxylic monoesters, acid anhydrides, and monocarboxylic acids and esters. Useful impact modifiers include dicarboxyl-substituted polyolefins, which are polyolefins that have dicarboxylic moieties attached thereto, either on the polyolefin backbone itself or on side chains. By "dicarboxylic moiety" is meant dicarboxylic groups such as one or more of dicarboxylic acids, diesters, dicarboxylic monoesters, and acid anhydrides.

The polyolefin that are functionalized may be homopolymers, copolymers or terpolymers. Examples of functionalized polyolefins include functionalized polyethylene, polypropylene, ethylene alkyl (meth)acrylate copolymers, ethylene alpha-olefin, ethylene propylene diene methylene copolymers (EPDM), styrene ethylene butadiene styrene (SEBS) copolymers and styrene butadiene styrene (SBS) copolymers.

Ethylene alkyl (meth)acrylate copolymers are thermoplastic ethylene copolymers derived from the copolymerization of ethylene comonomer and at least one alkyl (meth)acrylate comonomer, wherein the alkyl group contains from one to ten carbon atoms and preferably from one to four carbon atoms. The term "(meth)acrylate" refers to acrylate and/or alkyl. Ethylene alpha-olefins copolymers comprise ethylene and one or more alpha-olefins. Examples of alpha-olefins include but are not limited to propylene, 1-butene, 1-pentene, 1-hexene-1,4-methyl 1-pentene, 1-heptene, 1-octene, 1-nonene, 1-decene, 1-undecene and 1-dodecene. Ethylene propylene diene copolymers (EPDM) are terpolymers of ethylene, at least one alpha-olefin having from three to ten carbon atoms, and a copolymerizable non-conjugated diene such as norbornadiene, 5-ethylidene-2-norbornene, dicyclopentadiene, 1,4-hexadiene and the like. Preferably, the carboxyl-functionalized polyolefin impact modifier is an anhydride-functionalized polyolefin. When an anhydride-functionalized polyolefin is used as carboxyl-functionalized polyolefin, it may contain from at or about 0.2 to at or about 6 wt-%, preferably from at or about 0.5 to at or about 3 wt-% of an anhydride, the weight percentage being based on the total weight of the anhydride-functionalized polyolefin. Blends of polyolefins, such as polyethylene, polypropylene, and EPDM polymers with polyolefins that have been functionalized with an unsaturated compound containing a carboxyl moiety may be used as an impact modifier.

When present, the one or more impact modifiers comprise up to at or about 30 wt-%, or preferably from at or about 3 to at or about 25 wt-%, or more preferably from at or about 5 to at or about 20 wt-%, the weight percentage being based on the total weight of the resin composition.

The resin composition according to the present invention may further comprise one or more fillers such as calcium carbonate, carbon fibers, talc, mica, wollastonite, calcinated clay, kaolin, magnesium sulfate, magnesium silicate, barium sulphate, titanium dioxide, sodium aluminum carbonate, barium ferrite, and potassium titanate. When present, the one or more fillers are present in an amount from at or about 1 to at or about 60 wt-%, preferably from at or about 1 to at or about 40 wt-%, or more preferably from at or about 1 to at or about 35 wt-%, the weight percentages being based on the total weight of the resin composition.

The resin composition of the present invention may further comprise ultraviolet light stabilizers such as hindered amine light stabilizers (HALS), carbon black, substituted resorcinols, salicylates, benzotriazoles, and benzophenones.

The resin composition according to the present invention may further comprise modifiers and other ingredients such as for example flow enhancing additives, lubricants, antistatic agents, coloring agents, flame retardants, nucleating agents, crystallization promoting agents and other processing aids known in the polymer compounding art.

Fillers, modifiers and other ingredients described above may be present in the resin composition in amounts and in forms well known in the art, including in the form of so-called nano-materials where at least one of the dimensions of the particles is in the range of 1 to 1000 nm.

The resin compositions are melt-mixed blends, wherein all of the polymeric components are well-dispersed within each other and all of the non-polymeric ingredients are well-dispersed in and bound by the polymer matrix, such that the blend forms a unified whole. Any melt-mixing method may be used to combine the polymeric components and non-polymeric ingredients of the present invention. For example, the polymeric components and non-polymeric ingredients may be added to a melt mixer, such as, for example, a single or twin-screw extruder; a blender; a single or twin-screw kneader; or a Banbury mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained.

In another aspect, the present invention relates to a method for manufacturing an article comprising a step of shaping the resin composition according to the present invention and to the shaped article made from the resin composition of the invention. By "shaping" is meant any shaping technique, such as for example extrusion, injection molding, compression molding, blow molding, thermoforming, rotational molding and melt casting, injection molding being preferred. Examples of shaped articles are automotive parts, electrical/electronic parts, household appliances and furniture.

The resin composition according to the present invention is particularly suited for manufacturing a portable electronic device housing. By "portable electronic device housing" is meant a cover, backbone, or the like of the device. The housing may be a single article or comprise two or more components. By "backbone" is meant a structural component onto which other components of the device, such as electronics, microprocessors, screens, keyboards and keypads, antennas, battery sockets, and the like are mounted. The backbone may be an interior component that is not visible or only partially visible from the exterior of the telephone. The housing may provide protection for internal components of the device from impact and contamination and/or damage from environmental agents (such as liquids, dust, and the like). Housing components such as covers may also provide substantial or primary structural support for and protection against impact of certain components having exposure to the exterior of the device such as screens and/or antennas. By "portable electronic device" is meant an electronic device that is designed to be conveniently transported and used in various locations. Representative examples of portable electronic devices include mobile telephones, personal digital assistants, laptop computers, tablet computers, radios, cameras and camera accessories, watches, calculators, music players, global positioning system receivers, portable games, hard drives and other electronic storage devices, and the like. Preferably, the portable electronic device housing according to the present invention is, wherein the device is a mobile phone.

In a preferred embodiment, the housing of the present invention is a mobile telephone housing.

The following examples are provided to describe the invention in further detail. These examples, which set forth a preferred mode presently contemplated for carrying out the invention, are intended to illustrate and not to limit the invention.

EXAMPLES

The following materials were used for preparing the resin composition according to the examples of the present invention and the comparative examples:

Semi-aromatic amorphous polyamide: polyamide copolymer made of hexamethylenediamine, terephthalic acid (T) and isophtalic acid (I) (T:I=30 wt-%:70 wt-%, the weight percentage being based on the sum of terphthalic acid and isophthalic acid), this polymer is called PA6I/6T.

Semi-crystalline polyamide 1: polyamide copolymer made of adipic acid and 1,6-hexamethylenediamine, this polymer is called PA66.

Semi-crystalline polyamide 2: polyamide copolymer made of dodecanedioic acid and 1,6-hexamethylenediamine, this polymer is called PA612.

Semi-crystalline polyamide 3: polyamide copolymer made of sebacic acid and decamethylene diamine, this polymer is called PA1010.

Glass reinforcement agent: glass fibers having a non-circular cross-sectional shape, a cut length of 3 mm and a cross-sectional aspect ratio of about 4. These fibrous non-circular cross-sectional glass fillers are commercially available from Nitto Boseki Co., Ltd (product number: CSG3PA820).

Process aids: calcium montanate supplied by Clariant Produkte, Gerstholfen, Germany under the trademark Licomont® CAV102

Antioxidant: N,N'-hexane-1,6-diylbis(3-(3,5-di-tert-butyl-4-hydroxyphenylpropionamide)) supplied by Ciba Specialty Chemicals, Tarrytown, N.Y., USA under the trademark Irganox® 1098.

HALS: Poly[[6[(1,1,3,3-tetramethylbutyl)amino]-1,3,5-triazine-2,4-diyl][(2,2,6-,6-tetramethyl-4-piperidinyl)imino]-1,6-hexanediyl[(2,2,6,6-tetramethyl-4-piperidinyl)imino]] supplied by Ciba Specialty Chemicals, Tarrytown, N.Y., USA. under the trademark Chimasorb® 944.

Carbon black masterbatch: polyamide PA6 comprising 25 wt-% of carbon black.

Compounding

The compositions of Examples were prepared by melt blending the ingredients shown in Table 1 in a 40 mm twin screw extruder (Berstorff ZE40) operating at about 280° C. using a screw speed of about 300 rpm, a throughput of 110 kg/hour and a melt temperature measured by hand of about 290° C. The glass fibers were added to the melt through a screw side feeder. Ingredient quantities shown in Table 1 are given in wt-% on the basis of the total weight of the resin composition.

The compounded mixture was extruded in the form of laces or strands, cooled in a water bath, chopped into granules and placed into sealed aluminum lined bags in order to prevent moisture pick up. The cooling and cutting conditions were adjusted to ensure that the materials were kept below 0.15% of moisture level.

Mechanical Properties

Tensile moduli were measured according to ISO 527-2/1B/1. Measurements were done on injection molded ISO bar samples (melt temperature: about 290° C.; mold temperature: about 90° C. and a hold pressure of 90 MPa) with a thickness of the test specimen of 20 mm and a width of 4 mm according to ISO 527. The test specimens were measured at 23° C. dried as molded (DAM).

Mechanical properties were measured for 10 test specimens made of the resin composition according to the present invention (E1-E2) and test specimens made of comparative compositions (C1-C3) and the results is the average of them. The results are shown in Table 1 under the headings of "tensile modulus", and "charpy impact notched".

Sink Marks Measurements and Surface Appearance

Surface appearance and sink marks measurements were done on injection molded specimens (melt temperature: about 290° C.; mold temperature: about 90° C. and a hold pressure of 90 MPa). Test specimens having a shape of a rectangular 170×26×2 mm were molded in a mold having a glossy surface (i.e. no texture). Test specimens got the rib of 2×26×2 mm. The test specimens were measured at 23° C. dried as molded (DAM).

Sink marks were assessed by optical microscopy. Test specimens were cut through the rib in the perpendicular cross section. The sink was determined by measuring the depth of the depression in the part surface.

Surface appearance was assessed by visual inspection. Surfaces having a glossy and smooth appearance were deemed to have a mark of "3" and surfaces having a rough and very poor appearance were deemed to have a mark of "0".

TABLE 1

|  | C1 | C2 | C3 | E1 | E2 |
|---|---|---|---|---|---|
| semi-aromatic amorphous polyamide | 13.1 | 24.25 | 35.4 | 28.0 | 28.0 |
| semi-crystalline polyamide 1 | 35.4 | 24.25 | 13.1 | 10.5 | 10.5 |
| semi-crystalline polyamide 2 | — | — | — | 10 | — |
| semi-crystalline polyamide 3 | — | — | — | — | 10 |
| glass reinforcement agent | 50 | 50 | 50 | 50 | 50 |
| HALS | 0.4 | 0.4 | 0.4 | 0.4 | 0.4 |
| processing aids | 0.3 | 0.3 | 0.3 | 0.3 | 0.3 |
| antioxidant | 0.2 | 0.2 | 0.2 | 0.2 | 0.2 |
| carbon black masterbatch | 0.6 | 0.6 | 0.6 | 0.6 | 0.6 |
| Tensile modulus/GPa | 15.9 | 15.0 | 15.7 | 15.0 | 15.0 |
| Charpy impact notched/kJ/m$^2$ | 18.9 | 20.3 | 18.5 | 19.4 | 18.5 |
| Sink marks/microns | 20 | 8 | 1 | 8 | 10 |
| Surface appearance/* | 3 | 1 | 0 | 3 | 3 |

*0 means surfaces having a rough and very poor surface appearance, 3 means glossy and smooth surface appearance.

As shown by the Comparative Examples (C1-C3), for a fixed total amount of polyamides, the increase of the amount of the amorphous semi-aromatic polyamide led to a strong improvement of the reduction of sink marks from 20 to 1 microns, respectively for C1 and C3. Nevertheless, this increase of the amount of amorphous semi-crystalline polyamide simultaneously led to a strong degradation of the surface appearance of the molded test specimens from an excellent surface appearance (C1) to a very poor surface appearance (C3). For the same fixed total amount of polyamides in the compositions and a comparable amount of the amorphous semi-crystalline polyamide to maintain the good mechanical properties if compared with C2, the compositions according to the present invention (E1 and E2) exhibited a good balance of sink mark reduction and an excellent surface appearance. On the contrary, C2 exhibited a very poor surface appearance.

If compared with polyamide compositions comprising an amorphous semi-aromatic polyamide and a semi-crystalline polyamide conventionally used for manufacturing housing for hand electronic devices, the polyamide compositions according to the present invention, i.e. a composition comprising at least one amorphous semi-aromatic polyamide and at least two different semi-crystalline polyamides, show a good balance of properties in terms of good mechanical properties, excellent surface appearance and reduced sink marks.

What is claimed is:

1. A resin composition comprising:
   a) about 20 to about 50 wt-% of at least one amorphous semi-aromatic polyamide selected from the group consisting of poly(hexamethylene isophthalamide/hexamethylene terephthalamide); poly(hexamethylene isophthalamide/hexamethylene terephthalamide/4,4'bis(cyclohexyl)methane isophthalamide/4,4'bis(cyclohexyl)methane terephthalamide); poly(hexamethylene isophthalamide/4,4'bis(3,3'-dimethylcyclohexyl)methane isophthalamide/4,4'bis(3,3'-dimethylcyclohexyl)methane terephthalamide), poly(hexamethylene isophthalamide/hexamethylene terephthalamide/4,4'bis(3,3'-dimethylcyclohexyl)methane isophthalamide), poly(12-amidododecanamide/4,4'bis(3,3'-dimethylcyclohexyl)methane terephthalamide), poly(2,2,4-trimethylhexamethylene terephthalamide), poly(hexamethylene isophthalamide/hexamethylene terephthalamide/3-methyl-3,5,5-trimethylcyclohexyl isophthalamide/3-methyl-3,5,5-trimethylhexyl terephthalamide), and poly(caprolactam/2,2,4-trimethylhexamethylene terephthalamide/hexamethylene terephthalamide);
   b) about 10 to about 40 wt-% of at least two semi-crystalline polyamides, b1) and b2), wherein b1) is poly(hexamethylene adipamide) and is present in an amount from about 5 to about 20 wt-%, and b2) is selected from the group consisting of: poly(hexamethylene sebacamide); poly(hexamethylene dodecanoamide); poly(decamethylene sebacamide) and combinations thereof and is present in about 5 to about 20 wt-%; and
   about 10 to about 70 wt-%, of at least one glass reinforcement agent,
   wherein the weight percentages are based on the total weight of the resin composition.

2. The resin composition according to claim 1, wherein the glass reinforcement agent is fibrous non-circular cross-sectional glass.

3. The resin composition according to claim 1 further comprising one or more additional reinforcing agents.

4. The resin composition according to claim 1 further comprising one or more antioxidants.

5. A method for making an article comprising a step of shaping the resin composition of claim 1.

6. A shaped article formed from the resin composition described in claim 1.

7. The shaped article according to claim 6, which is a portable electronic device housing.

8. The portable electronic device housing according to claim 7, wherein the device is a mobile phone.

* * * * *